United States Patent Office 2,929,831
Patented Mar. 22, 1960

2,929,831
DIALKYL ACYLOXYALKYLPHOSPHONATES

Bernard Ackerman, Elkins Park, and Daniel Swern, Philadelphia, Pa., assignors to the United States of America as represented by the Secretary of Agriculture No Drawing. Application October 10, 1956
Serial No. 615,206

5 Claims. (Cl. 260—461)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a new class of organic phosphorus-containing compounds. More particularly, it relates to a new class of dialkyl acyloxyalkylphosphonates having the general formula, $$R^1-\overset{O}{\underset{\|}{C}}-O-(CH_2)_n-\underset{\underset{OR}{|}}{\overset{\overset{OR}{|}}{P}}\rightarrow O \quad (I)$$

In the above formula, R is either an ethyl, butyl, or hexyl radical; $R^1$ is an aliphatic hydrocarbon radical, preferably having from 11–17 carbon atoms and may be either saturated or unsaturated; and $n$ is 2 or 3.

As shown in Table II, below, compounds falling within this class in which $R^1$ has from 11 to 17 carbon atoms have been found to be excellent low temperature plasticizers; and are also useful as lubricants and lubricant additives.

In general, according to this invention, the compounds are produced by esterifying a fatty acid with a bromoalkyl alcohol and then reacting the resulting bromoalkyl ester with a trialkyl phosphite to produce the desired dialkyl acyloxyalkylphosphonate.

The above-described process may be represented by the following equations:

(a) $R^1-\overset{O}{\underset{\|}{C}}-OH+HO(CH_2)_n-Br \xrightarrow[\text{Catalyst}]{\text{Acid}} R^1-\overset{O}{\underset{\|}{C}}-O-(CH_2)_n-Br$ (Bromoalkyl ester) (II)

(b) $II+RO-\underset{\underset{OR}{|}}{\overset{\overset{OR}{|}}{P}} \xrightarrow{\text{Heat}} R^1-\overset{O}{\underset{\|}{C}}-O-(CH_2)_n-\underset{\underset{OR}{|}}{\overset{\overset{OR}{|}}{P}}\rightarrow O$ (I)

(trialkyl phosphite)  (dialkyl acyloxyalkyl-phosphonate)

In the above equations, R, $R^1$, and $n$ have the same significance as above.

In the following examples, commercial triethyl phosphite, tributyl phosphite, and trihexyl phosphite were employed. These were freshly distilled before use.

EXAMPLE 1

*Diethyl lauroxyethylphosphonate*

Fifty-two grams (0.17 mole) of 2-bromoethyl laurate was mixed with 58 grams (0.35 mole) of triethyl phosphite and the solution was refluxed until the refractive index became constant. The reaction mixture was vacuum distilled, yielding 35 grams of diethyl lauroxyethylphosphonate having a boiling point of 162–164° C. at 0.2 mm. and a $n_D^{30}$ 1.4419.

*Analysis.*—Calculated for $C_{18}H_{37}O_5P$: P=8.50%. Found: P=8.63%.

In a manner similar to that described in Example 1, above, other bromoalkyl esters were reacted with other trialkyl phosphites.

In Table I, below, there are listed the bromoalkyl esters used and their properties:

TABLE I

|  | M.P., °C. | B.P., °C. | $n_D^{30}$ |
|---|---|---|---|
| 2-Bromoethyl Laurate (Used in Examples 1, 6, 7). |  | 114–9/0.5 mm | 1.4564. |
| 2-Bromoethyl Myristate (Used in Example 2). |  | 157–60/0.9 mm | 1.4539. |
| 2-Bromoethyl Palmitate (Used in Example 3). | 43 |  | 1.4507 (55°). |
| 2-Bromoethyl Stearate (Used in Example 4). | 49 |  | 1.4500 (55°). |
| 2-Bromoethyl Oleate (Used in Example 5). |  | 185–6/0.6 mm | 1.4669. |
| 3-Bromopropyl Laurate (Used in Example 8). |  | 142–5/0.2 mm | 1.4585. |

In Table II, below, there are listed, in addition to the compound produced according to the detailed procedure of Example 1, compounds produced, following the method of Example 1, in which the bromoalkyl esters listed in Table I were reacted with other trialkyl phosphites:

TABLE II

DIALKYL ACYLOXYALKYLPHOSPHONATES: $R'-\overset{O}{\underset{\|}{C}}-O-(CH_2)_n-P\underset{\searrow OR}{\overset{\nearrow OR}{\phantom{P}}} \rightarrow O$

| Example No. |  | Percent Yield | B.P., °C./ mm. Hg | $d_4^{30}$ | $N_D^{30}$ | Phosphorus, Percent | |
|---|---|---|---|---|---|---|---|
|  |  |  |  |  |  | Calcd. | Found |
| 1 | $R'=C_{11}H_{23}$; $R=C_2H_5$; $n=2$ | 57 | 164/0.2 | 0.9837 | 1.4419 | 8.5 | 8.6 |
| 2 | $R'=C_{13}H_{27}$; $R=C_2H_5$; $n=2$ | 66 | 157–9/0.1 | 0.9703 | 1.4440 | 7.9 | 8.0 |
| 3 | $R'=C_{15}H_{31}$; $R=C_2H_5$; $n=2$ | 75 | 169–72/0.1 | 0.9607 | 1.4452 | 7.4 | 7.4 |
| 4 | $R'=C_{17}H_{35}$; $R=C_2H_5$; $n=2$ | 64 | 185–91/0.1 | 0.9391 (50°) | 1.4411 (50°) | 6.9 | 7.3 |
| 5 | $R'=C_{17}H_{33}$; $R=C_2H_5$; $n=2$ | 53 | 184/0.1 | 0.9680 | 1.4542 | 6.9 | 6.6 |
| 6 | $R'=C_{11}H_{23}$; $R=C_4H_9$; $n=2$ | 85 | 164–72/0.1 | 0.9587 | 1.4440 | 7.4 | 7.9 |
| 7 | $R'=C_{11}H_{23}$; $R=C_6H_{13}$; $n=2$ | 59 | 193–7/0.1 | 0.9409 | 1.4459 | 6.5 | 7.3 |
| 8 | $R'=C_{11}H_{23}$; $R=C_4H_9$; $n=3$ | 47 | 178–85/0.25 |  | 1.4451 | 7.1 | 7.4 |

In order to evaluate the utility as plasticizers of compounds produced according to this invention, several were combined with a synthetic resin according to the following recipe:

| | Parts |
|---|---|
| Vinyl chloride-vinyl acetate copolymer (95:5) | 64 |
| Plasticizer | 34 |
| Stabilizers | 2 |

Milled and then molded at 300° F.

For purposes of comparison, a commercial plasticizer, dioctyl phthalate, was also used. The results of these tests are summarized in Table III, below:

TABLE III
EVALUATION OF SOME DIALKYL ACYLOXYALKYL-PHOSPHONATES AS PLASTICIZERS
[For Vinyl Chloride: Acetate Copolymer.]

| Compound Tested | Tensile Strength, p.s.i. | Elongation, Percent | 100% Modulus, p.s.i. | Clash-Berg, °C. |
|---|---|---|---|---|
| Example 6, Table II | 2,640 | 380 | 1,200 | −52 |
| Example 7, Table II | 2,720 | 370 | 1,420 | −53 |
| Example 8, Table II | 2,600 | 340 | 1,390 | −47.5 |
| Dioctyl Phthalate (Commercial) | 3,030 | 390 | 1,300 | −25 |

As can readily be seen the products of this invention compare favorably with dioctyl phthalate when used to plasticize a 95:5 vinyl chloride: vinyl acetate copolymer.

We claim:
1. A dialkyl acyloxyalkylphosphonate having the formula

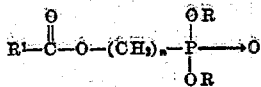

where R is a radical selected from the group consisting of ethyl, butyl, and hexyl, $R^1$ is an aliphatic hydrocarbon radical having from 11–17 carbon atoms, and $n$ is an integer from the group consisting of 2 and 3.
2. Diethyl lauroxyethylphosphonate.
3. Dibutyl lauroxyethylphosphonate.
4. Dihexyl lauroxyethylphosphonate.
5. Dibutyl lauroxypropylphosphonate.

References Cited in the file of this patent

UNITED STATES PATENTS
| | | |
|---|---|---|
| 2,668,800 | Johnston | Feb. 9, 1954 |
| 2,710,301 | Morris et al. | Jan. 7, 1955 |

FOREIGN PATENTS
| | | |
|---|---|---|
| 694,772 | Great Britain | July 29, 1953 |
| 509,034 | Canada | Jan. 11, 1955 |

OTHER REFERENCES
Pudovik: Chem. Abstract, vol. 47, col. 2688 (1953).